United States Patent [19]

Conibear

[11] 4,071,972

[45] Feb. 7, 1978

[54] FRAME AND FILAMENT TRIGGER FOR ANIMAL TRAPS

[75] Inventor: Frank Conibear, Victoria, Canada

[73] Assignee: Woodstream Corporation, Lititz, Pa.

[21] Appl. No.: 683,655

[22] Filed: May 6, 1976

Related U.S. Application Data

[63] Continuation-in-part of Ser. No. 479,082, June 13, 1974, abandoned.

[30] Foreign Application Priority Data

June 12, 1975 Canada .................................. 229239

[51] Int. Cl.² ........................................... A01M 23/26
[52] U.S. Cl. ...................................................... 43/92
[58] Field of Search ................... 43/88, 90, 91, 92, 77, 43/78, 79, 89

[56] References Cited

U.S. PATENT DOCUMENTS

| | | | |
|---|---|---|---|
| 211,751 | 1/1879 | Lewis | 43/88 |
| 1,231,065 | 6/1917 | Pues | 43/92 |
| 1,753,814 | 4/1930 | Weller | 43/92 |
| 2,947,107 | 8/1960 | Lehn | 43/92 |
| 3,010,245 | 11/1961 | Conibear | 43/92 |
| 3,146,545 | 9/1964 | Frost | 43/92 |
| 3,421,251 | 1/1969 | Hofmeister | 43/92 |

FOREIGN PATENT DOCUMENTS

| | | | |
|---|---|---|---|
| 75,313 | 7/1949 | Norway | 43/85 |

*Primary Examiner*—Warner H. Camp
*Attorney, Agent, or Firm*—Holman & Stern

[57] ABSTRACT

A trigger for a rotating frame animal trap has a trigger frame and filament attached thereto and positioned across it so that an animal sought to be trapped cannot pass through the trap without contacting the trigger frame or filament. The trigger is adapted to be positioned centrally in the plane between the jaws of the trap, when set, and is of sufficient size and so located that a desired animal cannot pass through the trap without contacting and moving the trigger to firing position.

11 Claims, 11 Drawing Figures

FRAME AND FILAMENT TRIGGER FOR ANIMAL TRAPS

The present application is a continuation-in-part of my application Ser. No. 479,082 filed June 13, 1974, now abandoned.

This invention relates generally to a trigger for release mechanisms for rotating frame traps of the type described in my U.S. Pat. Nos. 3,010,245, issued Nov. 28, 1961 and 3,760,531, issued Sept. 25, 1973. In particular, this invention relates to a trigger comprising a frame having filament positioned across it.

Heretofore, the triggers which have activated the release mechanisms for such traps have consisted of prongs positioned, when the trap is set, so that they project inwardly so as to lie approximately in a plane between the open jaws of the trap. My U.S. Pat. No. 3,010,245 shows a single prong, while Lehn, U.S. Pat. No. 2,947,107 and Hofmeister, U.S. Pat. No. 3,421,251 show double prongs, all of which project inwardly so as to lie approximately in this plane between the open jaws of the set trap. When an animal attempts to pass through the open frames of the set trap, it brushes the prong trigger, thereby activating the release mechanism and enabling the trap to close. There are several problems with such a prong-type trigger. First of all, the prong or prongs are readily visible to an animal which may therefore be discouraged from passing through the trap in order to avoid such a fence-like obstruction. In conjunction with this disadvantage, animals dislike pushing or brushing against such projections which might damage their fur, or make a scraping noise which would warn enemies of their presence and are thus further discouraged from passing through the trap. Such prong-type triggers also can often be "cheated" by an animal which can pass under or around them and thereby pass through the trap without activating the release mechanism or having the trap close. Mink, for example, are very cunning and agile animals, and have been known to pass through such a trap unharmed simply by passing around or under the prong trigger without touching it. Because of its nature, the prong-type trigger leaves large areas of the set trap through which an animal can pass in safety. Of course, if more prongs were used in the same trap to fill up such "safe" areas, the result would be that an animal would see more fence-like obstructions in its way and would be even less inclined to pass through the trap.

My U.S. Pat. No. 3,762,094, issued Oct. 2, 1973, describes a pan or foot-tread type of release mechanism of a general type often found on leg-hold traps, which avoids many of these difficulties peculiar to the prong-type of trigger. However (and the same is true with the prong-type of trigger), there is no certainty that an animal will be in a particular predetermined vulnerable position (which position would be the most effective one for killing the animal quickly and humanely), when the trap is sprung. An animal with long legs and a short neck, for example, might step on the foot tread before his vulnerable neck and heart-lung areas were sufficiently advanced into the trap to be squeezed by the jaws of the closed trap. In such a case the animal's head might be caught in one set of jaws of the trap. On the other hand, an animal with short legs and a long neck might have progressed past its most vulnerable position by the time it steps on the tread and activates the release mechanism. Also, animals have been known to pass through such traps without stepping on the foot tread at all since there is a relatively large space above the foot tread of the open set trap through which an animal can pass without touching any of the parts of the trap. In an attempt to reduce the chances of this occurring, trappers have set up around such traps miniature "obstacle courses" made, for example, of twigs sticking into the air, designed to ensure that an animal would step on the foot tread. Of course, such obstacle courses are a nuisance and time consuming for the trapper to have to make. Finally, in the same way that an animal may regard the prong-type trigger as an obstacle and a potential danger, thereby being discouraged from passing through the trap, an animal does not like to step on a platform which is elevated (i.e. under which it can see air), such as the foot tread, since, as in the case of a twig, there is a danger that the platform might "snap" and a noise might be made alerting its enemies to its presence. In view of the natural instinct of the animal not to step on such a platform, and in order to increase the effectiveness of such a trigger, trappers set such traps low in the ground or cover the platform with leaves and the like to give the appearance that the platform is at ground level and simply a continuation of the ground around the trap. In these cases there is an increased likelihood that branches, leaves, twigs, etc. will impede the action of the trigger and, as well, the closing action of the trap. Such a trap is also in a more vulnerable position with respect to snow, freezing rain and other natural phenomena, which, again, might impede the action of the foot tread on the closing action of the trap.

The present invention seeks to provide a trigger which will activate the release mechanism (causing the trap to close) more consistently when an animal is vulnerably positioned in the trap. This invention also seeks to provide a more effective trigger than those currently known for rotating frame traps, i.e. one which cannot be so easily circumvented by an animal passing through the trap and one which will not appear so uninviting to an animal.

The trigger according to the invention comprises a frame and a filament attached to this frame and positioned across it so that a desired animal cannot pass through the set trap frames without nudging the frame or filament. The trigger is adapted to be pivotally attached to a side of one of the frames of the trap and positioned in the plane between the open jaws of the trap. The area taken up by the frame and filament is sufficient that a desired animal passing through the open jaws of the trap cannot avoid nudging the trigger to firing position. The filament is scarcely visible or may even be invisible to the animal, and may be oriented in any way on the trigger frame so long as an animal sought to be trapped cannot pass through the trap without moving the frame to firing position. Of course, there must not be so much filament on the trigger than an animal would be discouraged from passing through the trap.

This new trigger can replace the prong-type trigger of the release mechanisms illustrated in my U.S. Pat. No. 3,010,245, and Lehn, U.S. Pat. No. 2,947,107 and Hofmeister, U.S. Pat. No. 3,421,251. However, since an animal entering a trap having this type of trigger would normally be pressing against the filament with its face, the trigger must in many instances yield very easily. I have therefore devised a release mechanism which is particularly well suited for use with this type of trigger. The trigger is pivotably attached to one of the jaws or sides of the trap frame so that it can pivot about that side. A release mechanism operating somewhat like a pair of tongs comprising two arms pivotally connected to each other is arranged across one pair of adjacent sides of the trap when in set position. The two arms have claw portions, which may be located at one end, which releasably lock about one of said sides of the trap frame. The other end of one of the arms is rotatably connected to the adjacent side of the other frame. The other arm is free to pivot about the pivot point to release the locked side of the trap frame, and has a lateral projection extending from near its end adjacent the end of the other arm which is rotatably connected to the frame. When in set position, one end of an $\mp$L"-shaped catch sits on top of this projection to ensure that this arm does not pivot so that the release mechanism holds the trap frames firmly in open set position. The base of the "L"-shaped catch is rotatably and slidably connected to the side of the frame to whih the one arm of the mechanism is connected. The trigger is rotatably suspended from one of the adjacent sides of the trap. A projection, fixed to the "L"-shaped catch engages a nearby portion of the trigger so that, when the release mechanism is set, pivoting the trigger to a predetermined extent will cause the catch to rotate off the lateral projection of the free arm, allowing that arm to pivot, so that the claws open and the trap frames close under urging from the actuator.

Because of the leverage actions involved, this type of release mechanism requires substantially less force on the trigger to activate the mechanism than previously known mechanisms, and is therefore admirably suited to the present trigger. Usefulness of this release mechanism, when used with a frame and filament trigger according to the present invention, can be readily appreciated in view of the fact that, in a normal situation, it is the animal's face which contacts the thread and filament trigger to result in the firing of the release mechanism. Thus, the fact that such a little force is required to fire the release mechanism is a definite advantage. As well, however, this release mechanism can be used, with advantage, in association with prong-type triggers and pan-type triggers.

The invention is illustrated, by way of example, in the drawings in which.

Figure 1:
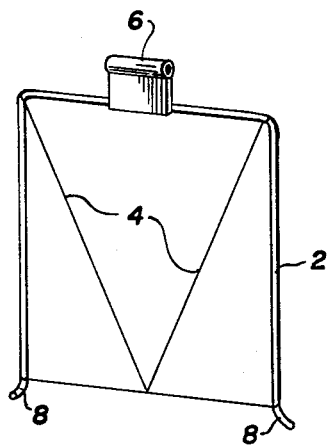
FIGS. 1 to 4 are perspective views of example embodiments of triggers according to this invention.
Figure 2:
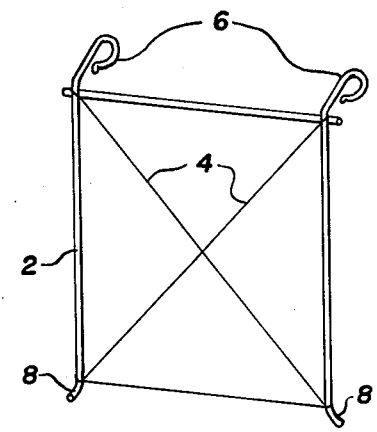
Figure 3:
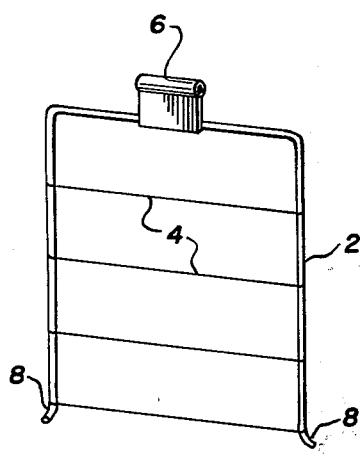
Figure 4:
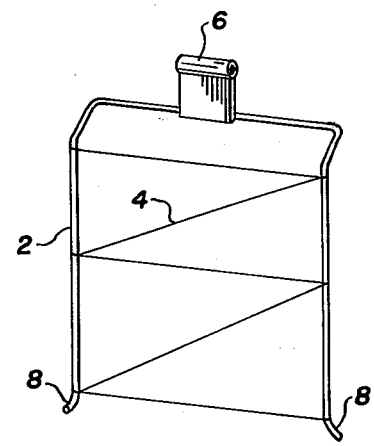

While the invention will be described in connection with the above drawings, it will be understood that it is not intended to limit the invention to the embodiments illustrated. On the contrary, it is intended to cover all alternatives, modifications and equivalents as may be included within the spirit and scope of the invention as defined by the appended claims.

Turning now to the drawings, in which similar features have been given similar reference numerals, FIGS. 1 to 4 illustrate example embodiments of triggers according to the invention, showing frames 2 having different arrangements of filaments 4. Attachment 6 represents any suitable means not necessarily shown accurately, for pivotably connecting the trigger to the side of one of the trap frames and incorporating it into the trap release mechanism. The trigger frames and filaments may of course have any desired shape and arrangement. The shapes and arrangements illustrated in the drawings are by way of example only. The main requirement is that the frame and filament occupy a substantial proportion of the total area of the passageway through the open set trap.

The frame may have notches, not shown in the figures, to assist in attaching the filaments to the frame and ensuring that they remain properly seated. It is not necessary that the filaments be positioned tightly across the frame. The filament may be made of any material which may or may not be visible to an animal. Animals are accustomed to walking through cobwebs which have been suspended across their trails or across openings through which they wish to proceed. Thus, the mere fact that the filament may be visible to an animal should not prevent the animal from contacting the filament with its face. Of course, filaments made of an "invisible" synthetic material such as nylon are particularly advantageous.

The frame may be made of wire or any other sturdy material. The ends 8 of frame 2 illustrated in FIGS. 1 to 4 have been bent slightly outwardly to assist attaching the filaments. Additionally, as shown in the construction illustrated in FIG. 2, the ends of the crossbar of the trigger frame may be slightly extended to provide a means for securing the filament in place. Where the frames are made of wire, a trapper can of course bend the frames to any desired shape (tightening or loosening the filaments accordingly) suitable to the particular conditions under which he may be trapping or the species of animal which he is intending to catch with the trap.

Figure 5:
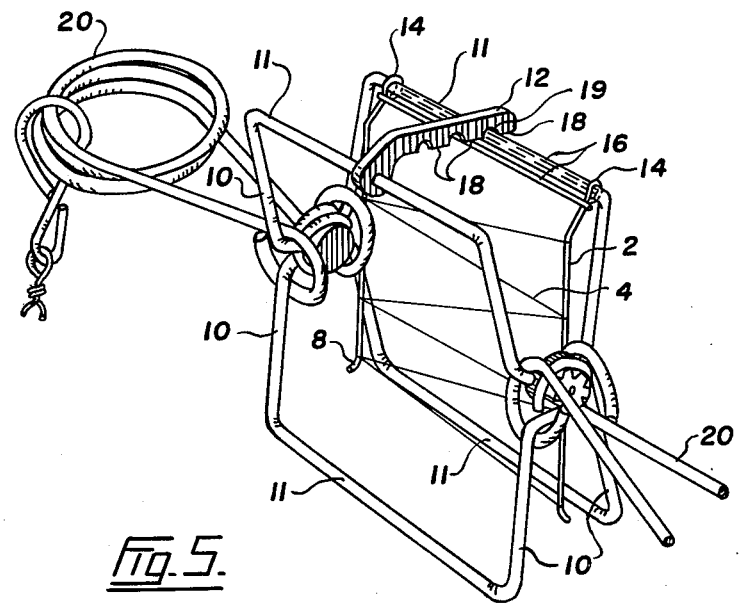
FIG. 5 is another embodiment of a trigger according to this invention designed to operate with a release mechanism presently commercially available, illustrated on a standard rotating frame trap in set position.

In FIG. 5, another embodiment of the trigger according to the invention, consisting of trigger frame 2 across which has been wound filament 4, has been incorporated into a rotating frame trap having a pair of similar frames of generally rectangular shape, pivotally connected at adjacent ends 10 for relative rotation on a common axis so as to form by their sides 11 two pairs of co-acting jaws. Trigger latch 12 is similar to those found on commercially available rotating frame traps. Trigger frame 2 is rotatably connected by any suitable means (here shown to be hooks 14) to the side of the frame of the trap upon which trigger latch 12 rests when the trap is in set position. Transverse members 16 of the trigger frame, on each side of this jaw of the trap frame, are positioned adjacent the bottom shoulders 18 of trigger latch 12 which are on each side of notch 19 in which jaw 11 is received. An animal, nudging trigger frame 2 or filament 4 will pivot trigger frame 2. Consequently one of transverse trigger frame members 16 will pivot, lifting one of shoulders 18 of latch 12, thereby dislodging the free end of latch 12 and permitting the trap to close under urging from actuator springs 20. This modification is particularly well suited, for example, for trapping beaver in water. While the action of this trigger mechanism is not as sensitive as might be required under some circumstances, a beaver swimming in the water would not have time to stop once its face came in contact with the filament of the trigger frame. A piece of wood might also be wedged between trigger frame ends 8 as bait for the beaver. As can be seen in FIG. 5, the trigger frame has been bent in such a way that a large part of it is positioned substantially in the plane between the open jaws of the trap. Of course, in the field the trap can have any desired orientation (besides the one illustrated), so long as latch 12 will rest securely on the corresponding side 11 of the trap frame when in set position.

Figure 6:
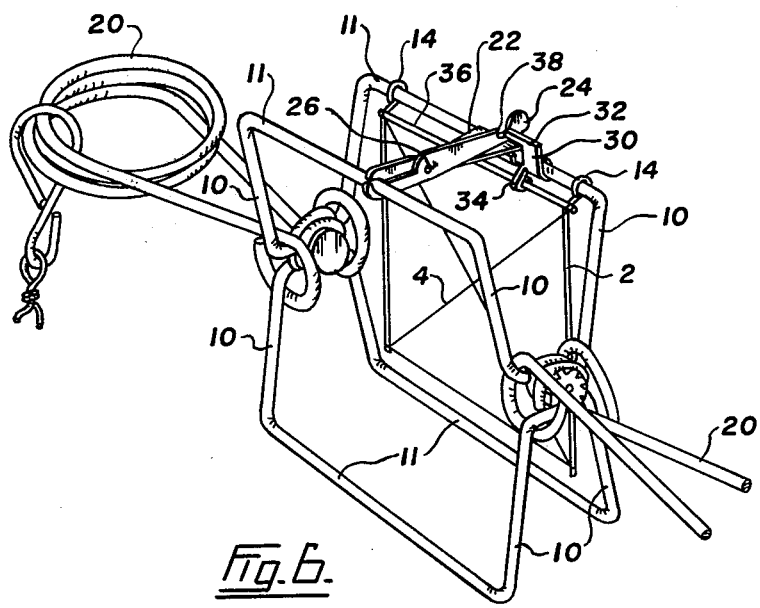
FIG. 6 is a perspective view of another embodiment of a trigger according to the present invention used in conjunction with a sensitive release mechanism shown on a standard rotating frame trap in set position.

A more sensitive release mechanism which might be used on a trail on land to catch animals is illustrated in FIG. 6. Again, trigger frame 2 is positioned, in the open set trap, substantially in the plane lying between the open jaws of the trap. Filament 4 lies across the area surrounded by the trigger frame. The trigger frame is rotatably connected to one of the frames by hooks 14. The release mechanism consists of fixed arm 22 rotatably and slidably connected to side 11 of one of the frames and a free arm 24 pivotably connected to fixed arm 22 at pivot 26. The free end of fixed arm 22 and corresponding end of free arm 24 are of claw-like shape and co-operate with each other when the trap is in set position to firmly hold the adjacent side 11 of the other frame. The opposite end of free arm 24 has a lateral projection 28 near its extremity in the vicinity of the side of the trap frame to which fixed arm 22 is attached. This projection has a convex-curved outer surface 29 (see FIG. 8). An "L"-shaped catch 30 is rotatably and slidably connected at its base to the same side of the trap frame as lever arm 22. When the trap is in set position, extension 32 of catch 30 rests on top of projection 28, thereby preventing the claw end of this free arm from opening to release the adjacent side of the other frame. A hook-like projection 34 attached to catch 30 loops around transverse bar 36 of trigger frame 2. When trigger frame 2 is pivoted to a predetermined position, transverse bar 36 swings projection 34 sufficiently so that extension 32 of catch 30 slips off the curved outer surface 29 of projection 28, freeing lever arm 24 and causing the trap, under tension from actuator spring 20, to close. By having the curvature of outer surface 29 conform to the arc made by the co-operating surface of catch extension 32 when catch 30 is rotated, only a steady, gentle force on trigger frame 2 is required to release the release mechanism and fire the trap. In addition, depending on the shape of the hook of projection 34, a small amount of "play" can be left with trigger frame 2 before the trap fires. This provides an opportunity for an animal to "test" the filament across the trigger frame and develop a sense of security before passing through the trap. Projection 28, as illustrated in FIG. 7, is triangular in plane so that by positioning catch 30, the amount of rotation of trigger frame 2 before the trap fires can be regulated.

The sensitivity of the release mechanism can be adjusted by selecting the profile of the "claw" end of arm 24 which bears against frame side 11 and prevents it from closing when in set position. By decreasing the portion of this end of arm 24 which is capable of gripping side 11, i.e. by reducing its gripping surface, the tension is increased between extension 32 and projection 28, and the release mechanism is made more difficult to fire (i.e. less sensitive). Notch 38, best shown in FIG. 8, located at the foot of projection 28 on free arm 24 of the release mechanism provides an additional element of safety. When extension 32 of catch 30 is positioned within notch 38, the sides of the notch prevent catch 30 from rotating about its frame side 11 sufficiently to activate the release mechanism and fire the trap. Thus, the set trap, with catch 30 in this safety position, can be positioned in the field with no danger to the trapper of accidental discharge. When the trap is in position and ready to be fully activated, the trapper simply slides catch 30 along its side 11 so that extension 32 rests on projection 28 but is no longer positioned within notch 38.

Figure 7:
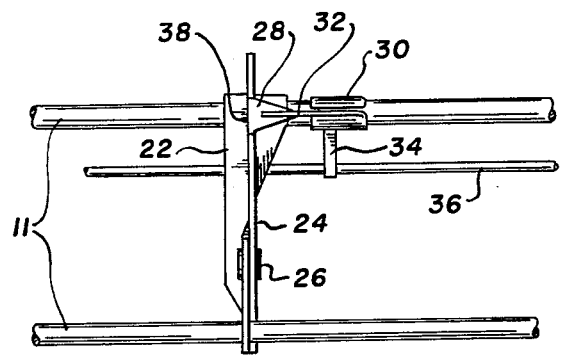
FIG. 7 is a fragmentary top view of the release mechanism of FIG. 6.
Figure 8:
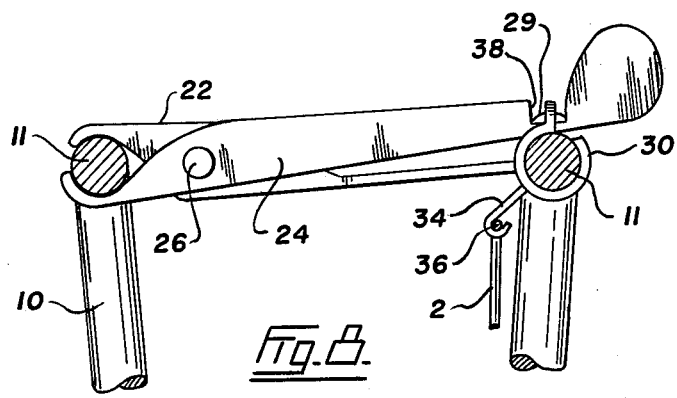
FIG. 8 is an enlarged fragmentary side view of the release mechanism of FIGS. 6 and 7.

The release mechanism illustrated in FIGS. 6 to 8 shows the arms pivoting at a point located between their respective ends, and one pair of ends of these arms being of claw-like shape. In another embodiment of such a release mechanism, which embodiment has not been illustrated in the drawings, the fixed and free arms are modified so that their pivot point is located near their ends remote from the end of the fixed arm which is connected to the one side of the trap frames. The claw portions of these arms are accordingly modified and positioned between the pivot and the other ends of these arms. The latch release means of this embodiment may be similar to that illustrated on the release mechanism illustrated in FIG. 6 to 8. It can be readily appreciated that, since the pivot is relatively further removed from the latch release means of this alternative embodiment, than is the case for the release mechanism illustrated in FIGS. 6 to 8, and even more sensitive release mechanism is provided.

It should be noted that the traps illustrated in FIGS. 5 and 6 could be set with the jaws oriented vertically instead of horizontally.

Since, in the normal course of events, an animal's head and not its paws or another part of its body, move the trigger to firing position, it follows that the animal will be virtually in the same position relative to the jaws of the trap each time the trap is fired. With the pan-type trigger, an animal frequently steps over the pan with its front feet and steps on it with one or both hind feet resulting in it being caught by one set of jaws only across the small of the back or somewhere to the rear of the chest. Since these are not particularly vulnerable areas the trap's effectiveness is reduced. With the prong-type trigger an animal often pushes against the trigger with the rear end of its body or its hips which are generally larger than the front part of the animal. Consequently when sprung by the hind feet of the animal, the animal is similarly caught as described for the pan-type of trigger. In both cases, the animal may not be killed instantly and suffering may be prolonged, sometimes for many hours. By properly designing the thread and filament trigger according to the present invention and using it with a proper size of trap, more consistent trapping of animals in vulnerable positions can be secured.

It should also be pointed out that the inherent disadvantage of the pan-type trigger, namely that it cannnot be effectively elevated in view of the natural instinct of an animal not to step on an elevated platform, is avoided when a trigger according to the present invention is used. A trap having such a frame and filament trigger can be raised above the ground level when set for an animal. In this way, the effectiveness of the trap in catching more animals is increased. For example, in the case of a four and one-half inch square trap with a pan-type trigger set at ground level, the top of the trap would be no more than four inches from the ground. While this might be satisfactory for small animals, slightly larger animals or long-legged animals would not try to enter the trap frames because of their height. However if such a trap were raised from the ground (as it could be with the trigger according to the present invention) the top of the frame might, for example, be eight inches from the ground. Such a larger animal might try to step over the lower jaws but when attempting to do so, it would press against th filament with its head and be caught in the trap by its neck. Thus, it can be readily appreciated that the frame and filament trigger according to the present invention greatly adds to the versatility of the rotating frame trap when replacing a pan-type trigger.

Figure 9:
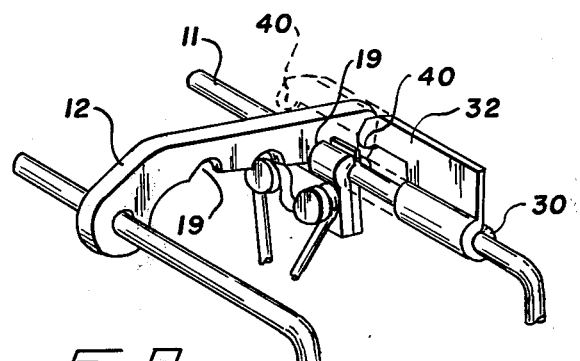
FIG. 9 is a perspective view of a portion of a commercially available rotating frame trap having a modification of the release mechanism of FIG. 6 as a safety feature.

FIG. 9 illustrates a modification of the "L;38 -shaped catch applied to a standard commercially available trigger mechanism on a rotating frame trap as a convenience and safety feature. The problem with the prong-type trigger mechanism illustrated in FIG. 9 (also described and illustrated in Lehn, U.S. Pat. No. 2,947,107) is that during and after the setting of the trap, trap frame side 11 which is intended to be seated securely in notch 19 of latch 12 can easily accidentally jump free of notch 19 causing the trap to close unintentionally. I described a safety catch in my U.S. Pat. No. 3,010,245 designed to avoid this hazard, which consisted of a bar slidably and rotatably attached to one of the frame sides and having a notch adapted to hook over the end member of the other frame to securely hold the trap in open position so that it could be set in safety. However, such a safety catch is cumbersome and there is a danger that, when the catch is removed from "safety position", the release mechanism may be accidentally dislodged or the trap may be jarred so that the trigger mechansim is activated.

As shown in FIG. 9, an "L"-shaped catch 30, with extension 32 is slidably and rotatably connected to the side of the frame of a standard commercially available rotating frame trap over which trigger latch 12 rests when the trap is in set position. Extension 32 is sufficiently close to the side of the frame that, when catch 30 is slid over trigger latch 12 seated on side 11, there is insufficient space left for latch 12 to become completely unseated by the relevant side of the frame slipping completely out of notch 19 to release the trap. This feature is similar to the half-cock feature on a gun. However, since there is some play between the outer part of trigger latch 12 and the inner surface of extension 32, when catch 30 is pivoted in safety position over latch 12, it forces latch 19 into fully seated, set position over the corresponding side 11 on the trap frame. This provides a simple and safe means of setting the trap. A slight nose 40 at the end of extension 32 provides added safety, in that this nose makes it more difficult for the catch to unintentionally slide out of safety position over trigger catch 12. Of course, when the catch is in safety position as shown in phantom in FIG. 9, and it is desired to prepare the trap for firing, it is necessary only to slide catch 30 along side 11 until extension 32 is no longer positioned over trigger catch 12, thereby permitting trigger catch 12 to jump clear of side 11 when the trigger is moved to firing position.

Figure 10:
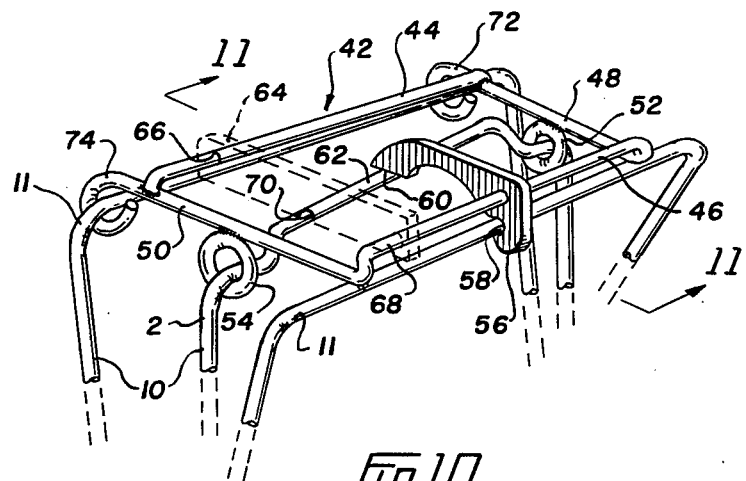
FIG. 10 is a partial perspective view of a trap having a trigger according to the invention.

FIG. 10 illustrates a preferred embodiment of trigger mechanism according to a further feature of the present invention. FIG. 10 shows a trigger bearing frame 42 attached to one side 11 and extending towards the other side 11 when the trap is in the open, set position as shown in the figure. The frame 42 is made up of cross member 44 and 46 joined by side members 48 and 50. Side members 48 and 50 are provided with loops 52 and 54 respectively that function as pivotal mounting means for the trigger 2. The pivotal mounting means 52 and 54 also define a pivotal axis around which the trigger 2 pivots. For clarity filaments 4 have been omitted.

A catch 56 is pivotally mounted on cross member 46. The catch 56 is provided with a recess 58 to engage the adjacent side 11. The catch 56 is also provided with an abutment surface 60 which abuts the upper side of the trigger 2. Trigger 2 is provided with abutment means that extend from the pivotal axis defined by the mounting means 52 and 54 to abut the abutment means 60 on the catch 56. In FIG. 10, the upper edge 62 of the trigger 2 is shaped to extend out of the pivotal axis between loops 52 and 54.

In the illustrated embodiment, the trap is provided with a safety catch 64 shown in dotted lines. The safety catch slidably engages cross members 44 and 46 of the trigger bearing frame at holes 66 and 68 respectively. The catch 64 is provided with a notch 70 that engages the upper edge 62 of the trigger 2.

A further feature that is illustrated in FIG. 10 is that the upper edge 62 of the trigger 2 is inclined upwardly from mounting 54 to mounting 52. This provides variable sensitivity for the trigger.

Furthermore, the frame 42 illustrated in FIG. 10 is pivotally attached to the side 11 by loops 72 and 74 formed respectively on sides 48 and 50 of the trap bearing frame. This facilitates storage of the unset trap.

The trap is shown in set position in FIG. 10. When the trap is set but before the trap has been positioned in its desired position, it is preferable that the safety catch 64 be slid along the edges 44 and 46 to, for example, the position shown in FIG. 10. The trap is then set in the desired position and the safety catch 64 then slid along cross members 44 and 46 towards edge member 50. The shaping of the trigger 2 by the bending of the upper edge 62 is such that the catch 64 can be positioned adjacent side member 50 where it will not contact the portion 62 of the trigger 2.

Figure 11:
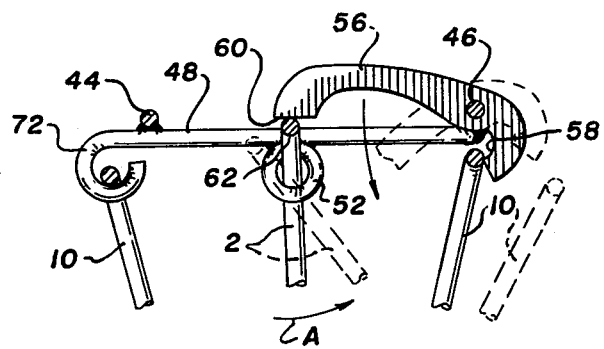
FIG. 11 is a section along the line XI—XI in FIG. 10.

As perhaps most clearly indicated in FIG. 11, when an animal contacts the filaments 4 (not shown) of the trigger 2, the trigger is moved towards the dotted line position shown in FIG. 11, that is, in the direction of the arrow A. As the trigger 2 pivots about the loops 52 and 54, upper edge 62 of the trigger 2 moves linearly out of contact with the abutment surface 60 of the catch 56. When the catch 56 ceases to contact the upper edge 62 of the trigger 2 the tendency of the trigger to pivot under gravity as shown in FIG. 11 but, principally, the force of the actuator 20 moves the side 11 out of engagement with the recess 58 to close the trap. It should, of course, be noted that the trap can be sprung from either side. The abutment surface 60 of catch 56 is relatively short in length and a movement of the trigger 2 in either direction will move the upper edge 62 out of contact with the abutment surface 60 of catch 56.

The inclination of the upper edge 62 provides a varying sensitivity feature for the trap. This is clearly not essential in the invention but if the catch 56 is moved close to side member 50 of the trap bearing frame 42, the trap becomes more sensitive as the catch 56 tends to lie closer to the release position. That is, hook 56 tends to lie parallel to the ground relatively close to the release position. It will be noted that as the hook 56 is moved towards side member 48, then the abutment surface 60 is raised higher than the recess 58 thus increasing the grip of the catch 56 on the frame side 11. A plurality of catches 56 may be used to provide a wide range of sensitivities. If a catch mounted on edge 46 but not required then it may simply be slid out of the way as described above for release of the safety catch 64.

The trigger of FIGS. 10 and 11 is of particular use where a trap is liable to freeze. There are no parts where water can become trapped to form a bond between parts of the trap when the water freezes.

Thus it is apparent that there has been provided, in accordance with the invention, an improved trigger and release mechanism for a rotating frame trap that fully satisfy the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. In an animal trap of the type having similar first and second frames, each frame having sides serving as jaws and ends extending therebetween and which are pivotally connected through adjacent ends for relative rotation between set and closed positions about a common axis, an actuator capable of rapidly and forcefully effecting such rotation, and a mechanism for releasably maintaining the jaws in open, set position, an improved trigger comprising:
   a generally U-shaped three-sided trigger frame rotatably mounted at the base thereof to one of said trap frame sides, said trigger frame circumscribing an area equal to a substantial portion of the total area of the passageway through the open, set trap;
   a filament having an extremely thin cross-section attached to and spanning the inner area of said trigger frame such that an animal sought to be caught cannot pass through or around said trigger frame without nudging the trigger frame or filament to activate the release mechanism, said filament having a cross-section such that said filament is from substantially invisible to having a cobweb-like appearance;
   attachment means for rotatably connecting the trigger frame to one of said trap frame sides, the trigger frame being disposed within the open jaws of the trap for activating said release mechanism to enable the jaws of the trap to close, said attachment means comprising:
   a trigger-bearing frame attached to one jaw of one frame of the trap and extending, when the trap is in the open, set position toward the other frame of the trap;
   pivotal mounting means for the generally U-shaped, three-sided trigger frame on the trigger-bearing frame, the generally U-shaped, three-sided trigger frame pivoting around a pivotal axis;
   a catch pivotally mounted on the trigger-bearing frame remote from the jaw to which the trigger-bearing frame is attached, the catch being adapted to engage the jaw of the trap remote from the jaw to which the trigger-bearing frame is attached and having means to abut the generally U-shaped, three-sided trigger frame; and
   abutment means on the generally U-shaped, three-sided trigger frame extending out of the pivotal axis to abut the abutment means on the catch.

2. A trigger as claimed in claim 1 wherein said filament is made of synthetic fibre.

3. A trigger as claimed in claim 1 in which the trigger bearing frame includes cross members adjacent the trap jaws between which the trigger bearing frame extends and in which the catch is mounted on one cross member and in which a safety catch engages the cross members of the trigger bearing frame, the safety catch being provided with a recess to engage and retain the trigger in position relative to the cross members.

4. A trigger as claimed in claim 1 in which the upper edge of the trigger frame is shaped to extend out of the pivotal axis between the pivotal mounting means.

5. A trigger as claimed in claim 4 in which the upper edge of the trigger frame is shaped so that, in the open, set position of the trap, the upper edge is at varying distances from the pivotal axis.

6. A trigger as claimed in claim 4 in which the trigger bearing frame is pivotally attached to said one jaw of one frame of the trap.

7. An animal trap of the type having similar first and second frames, each having sides serving as jaws and ends extending therebetween, and which are pivotally connected through adjacent ends for relative rotation between set and closed positions about a common axis, an actuator capable of rapidly and forcefully effecting such rotation, a mechanism for releasably maintaining the trap in set position which comprises, when the trap is in said set position, a latch device extending between an adjacent pair of jaws so as to releasably maintain them in set position and a latch release means adapted, upon actuation by a trigger, to effect disengagement between one portion of the latch device and one of the jaws so as to permit such rotation to closed position, and an improved trigger, said trigger comprising a trigger frame disposed within the open jaws of the trap and circumscribing a substantial portion of the total passageway therethrough, and a filament extending across said trigger frame, and wherein said trigger is rotatably connected to one of the adjacent sides of said first and second trap frames and has a transverse member spaced parallel to said trap frame side; and said release mechanism comprises a fixed arm one end of which is connected to one of said adjacent sides of said first and second trap frames and a free arm pivotally connected to said fixed arm, a portion of said fixed arm and a corresponding portion of said free arm being of claw-like shape and cooperating with each other to firmly hold the other, corresponding adjacent trap frame side to maintain the trap in set position, the free arm having a lateral projection in the vicinity of the trap frame side to which the fixed arm is attached, and an "L"-shaped catch rotatably and slidably connected to the side of the trap frame to which the fixed arm is attached and having an extension spaced substantially parallel to said trap frame side, the inner surface of which extension rests on top of the free arm projection, thereby preventing the claw portion of the free arm from opening to release the other corresponding adjacent trap frame side, said "L"-shaped catch having a hook projection fixed thereto which engages the transverse member of the trigger frame, whereby, when the trigger frame is pivoted, its transverse member pivots the hook projection of the catch sufficiently to cause the catch extension to slip off the outer surface of the free arm projection, thereby causing the claws to open and permitting the trap to close under urging from the actuator.

8. An animal trap according to claim 7 wherein the fixed arm and free arm of the release mechanism pivot at a point located between their respective ends, and wherein the end of the fixed arm opposite to the end which is connected to the one side of the trap frames, and the corresponding end of the free arm are of claw-like shape.

9. An animal trap according to claim 7 wherein the projection of the free arm of the release mechanism has a convex-curved outer surface, the radius of curvature of which conforms to the arc formed by the cooperating surface of the catch extension when the catch is rotated, whereby the force on the trigger frame required to actuate the release mechanism and fire the trap is relatively constant as the catch is rotated.

10. An animal trap according to claim 9 wherein said lateral projection of said free arm of the release mechanism tapers to a point whereby the amount of rotation of the trigger frame before the release mechanism is actuated can be adjusted by positioning the extension of the catch at a predetermined position along the projection.

11. An animal trap according to claim 7 wherein the free arm of the release mechanism has a notch at the base of the lateral projection, said notch being adapted to receive the extension of the catch in safety position, whereby the sides of the notch prevent the catch from rotating sufficiently to have its extension slip off the outer surface of the lateral projection of the free arm.

* * * * *